Oct. 31, 1950   S. ALOIS   2,527,511
ANIMAL TRAP
Filed Feb. 19, 1946
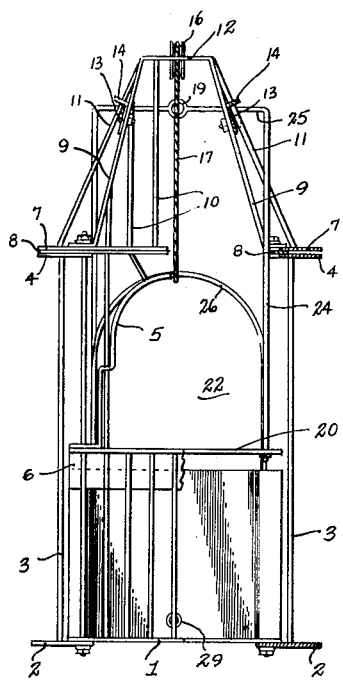
FIG. 1.
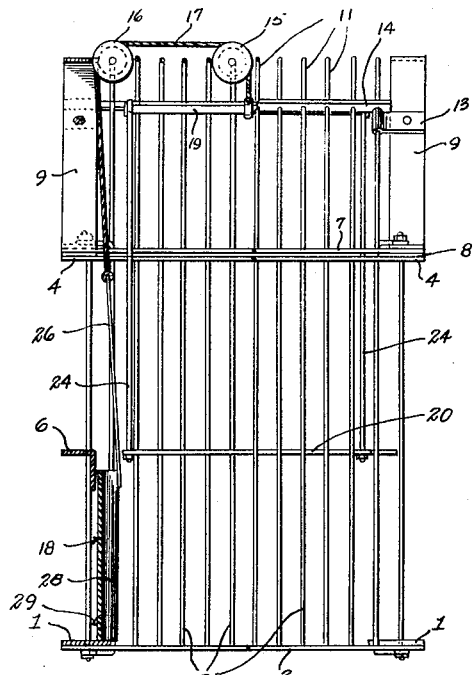
FIG. 2.
FIG. 6.
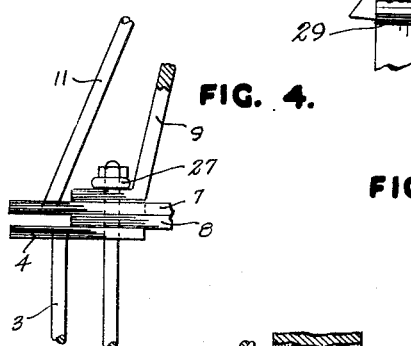
FIG. 4.
FIG. 3.
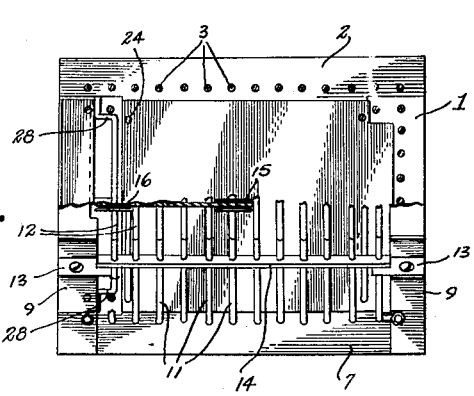
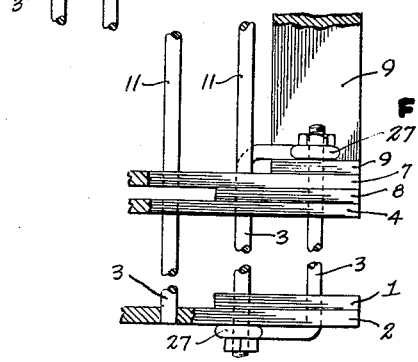
FIG. 5.
Inventor
SUNDAY ALOIS,
Attorneys Patented Oct. 31, 1950

2,527,511

UNITED STATES PATENT OFFICE 2,527,511

ANIMAL TRAP

Sunday Alois, Detroit, Mich.

Application February 19, 1946, Serial No. 648,620

3 Claims. (Cl. 43—61)

This invention relates to animal traps and especially to devices of this character which are adapted to trapping animals or birds without harm to them.

It is an object of the invention to provide a device of the above character which shall be rugged of construction, and which shall nevertheless be economical and simple to fabricate.

It is a further object of the invention to provide an animal trap of the above character which shall be largely constructed of steel bars, and which shall be of such design, that no change or modification of the design shall be required in order to modify the device for use with large or small animals, the same design being applicable in any case, it being required merely to construct the trap on a larger scale for the larger animals, and on a smaller scale for the smaller animals.

It is a still further object of the invention to provide a device having an access opening for animals or birds and a movable platform adjacent this access hole, so constructed and arranged that upon entrance of an animal or bird through the access hole and onto the platform, the said platform will be lowered by reason of the weight of the animal. A door is further provided for blocking egress from the access hole, said door being raised into blocking position as the platform is lowered.

It is a still further object of the invention to provide a device of the above character which shall be capable of assembly on sight, and which shall be portable.

The above and still further objects of the invention will become apparent upon further study of the following detailed description, when taken in conjunction with the appended drawings, wherein:

Figure 1 is a front elevational view, partly cut away, of a trap constructed in accordance with the invention;

Figure 2 is a side elevational view of Figure 1;

Figure 3 is a plan view, partly cut away, and corresponding to Figure 2;

Figure 4 is an enlarged view of a detail of the construction of the device, as illustrated in Figure 1; and Figure 5 is an enlarged view, partly in section, of a further detail of construction of the device, as illustrated in Figure 2.

Figure 6 is an enlarged sectional view of the latch for holding the door in its raised position.

Referring now to the drawings in detail, there is provided a bottom frame comprising front and rear plates 1, and side plates 2, secured together to form a rectangular assembly and suitably drilled to accept the cage bars 3, which may be round rods and may, if desired, be threaded at their lower ends for purposes of assembly and provided with suitable securing nuts. It will, of course, be obvious that other means and methods may be utilized for securing the side rods to the bottom frame, if desired.

An upper frame 4 may be secured to the upper ends of the rods in much the same manner as is true of the bottom frame.

Formed in the front bar structure of the cage is an access opening for animals, denominated 22, the bars 3 being suitably cut away or provided of short length for this purpose. The outline of the access door 22 may be formed of a suitably bent bar 5, secured at its ends to an angle iron 6, which forms a sill for the access opening.

A cover for the cage is provided, and comprises a pair of flat straps 7, adapted to extend along the sides of the cage, and a pair of superposed flat straps 8, adapted to extend along the front and rear of the cage, the straps 7 being secured to the straps 8 at the ends thereof.

A pair of flat steel strap members 9 formed like an inverted V having its vertex truncated are secured one to the front and one to the rear cover frame at the corners thereof; and round vertical bars 10 extend from the flat straps 8 to the strap members 9.

Likewise, a series of bars or rods 11 extend from the side straps or plates 7, at an angle to the vertical from each strap or plate, and are suitably bent to provide horizontal portions 12 over the central portion of the cage.

Stiffeners are provided for the rods 11 in the form of four clamps 13 each bolted to a strap member 9 and an adjacent bar 11. A strap 14, having its plane perpendicular to the bars 11 and suitably drilled to enable passage of the bars 11 therethrough, extends between the pairs of clamps 13. Since both clamps 13 and strap 14 are secured to the previously mentioned adjacent bars 11, a firm stiffening of the bar structure of the cage roof results.

Rotatably secured to two horizontal portions 12 of bars 11 are a pair of sheaves 15 and 16. The sheave 15 is located centrally of the cage and the sheave 16 adjacent the front of the cage. A cable 17 runs over the sheaves 15 and 16 and is secured at one end to a door 18 and at its other end to strong arm 19 for lifting a platform 20, normally situated at about the level of the sill 6.

The platform 20 is arranged to have only slightly smaller dimensions than the inside of the cage and to be translatable vertically therein, being suspended by a pair of inverted U-shaped members each comprising two vertical arms 24 and a horizontal joining member 25. The members 25 are supported on said strong arm 19 which is itself secured to the cable 17, whence the platform 20 may be translated vertically upwardly or downwardly.

Serving at least partially as a counter-weight for the platform 20, is a door 18, which moves upwardly when the platform 20 moves downwardly, and vice versa. The door 18 is constructed of sheet metal or plate, and in horizontal section is shaped like a shallow flat-bottomed U, the upstanding arms 28 of which have laterally offset lips extending therefrom parallel to the bottom. The lips and arms of the door 18 are so arranged with respect to the bars of the cage that lateral movement of the door is substantially prohibited. The door 18 is suspended from an inverted U-shaped member 26, the arms of which are secured to the door and the base segment of which is attached to the cable 17.

Referring now specifically to Figure 5 of the drawings, there is disclosed a detail, in enlarged view, of the junction structure where the roof of the cage meets the cage structure proper, and there is illustrated how two of the bars 3 are especially constructed so as to pass one entirely through the plate structure at the top of the cage proper, and there to be threaded, and the other entirely through the plate structure at the bottom, and there to be threaded, and each unthreaded end of the said adjacent rods is bent at right angles and shaped to form a loop 27 about the threaded portion of the rod adjacent to it. Nuts may then be threadedly engaged to the threaded portions of the rods 3, thereby to lock the roof portion of the cage to the cage proper.

The door 18, Figure 6, is provided with a spring actuated latch 29 which is adapted to rest upon the top of the sill 6 when the door is in its raised position, to thereby hold it in such position.

Having described one embodiment of the invention it is deemed evident that modifications may be made in the structure as described and illustrated, both as to the arrangement and details, and it is accordingly intended to be restricted only by the spirit of the invention, as defined in the appended claims.

What I claim is:

1. A device of the class described, comprising the combination of, a bottom frame member, a top frame member, a series of bars joining said bottom and top frame members to form a cage, a top closure member comprising a supporting frame adapted to be fitted to said top frame member, bar means for joining said bottom frame member, said top frame member and said supporting frame, a series of bent bars each comprising a horizontally oriented portion forming part of said top closure member, sheaves each rotatably mounted on a horizontal portion of one of said bent bars, a platform vertically translatable within said cage, an access opening formed in said series of bars intermediate the ends thereof and having a sill, said platform being normally retained at substantially the level of said sill, a closure member for said access opening normally retained below the level of said sill, and a cable passing over said sheaves and secured at one end to said platform and at the other end to said closure member for said access opening, whereby upon depression of said platform said closure member is raised to an elevated position closing said access opening.

2. A device of the class described, comprising the combination of a bottom frame member, a top frame member, a series of bars joining said bottom and top frame members to form a cage, a top closure member comprising a supporting frame adapted to be fitted to said top frame member, bar means for joining said bottom frame member, said top frame member and said supporting frame, a series of bent bars each comprising a horizontally oriented portion forming part of said top closure member, sheaves each rotatably mounted on a horizontal portion of one of said bent bars, a platform vertically translatable within said cage, an access opening formed in said series of bars intermediate the ends thereof and having a sill, said platform being normally retained at substantially the level of said sill, a closure member for said access opening normally retained below the level of said sill, a cable passing over said sheaves and secured at one end to said platform and at the other end to said closure for said access opening, and a latch carried by said closure member, and said latch being engageable with said sill upon raising of said closure member to lock said closure member in an elevated position.

3. A cage-type of trap, including an elevated access opening including a sill, a vertically-translatable platform, a vertically-translatable closure for said opening, said platform normally being positioned in substantial horizontal alignment with said sill, said closure being normally positioned below said sill, means operatively connecting said platform and closure together whereby to elevate the latter to close said opening upon depression of said platform, and latch means on said closure, said latch means being engageable with said sill upon elevation of said closure to an opening-closing position to lock said closure in such position.

SUNDAY ALOIS.

REFERENCES CITED

The following references are of record in the file of this patent:

UNITED STATES PATENTS

| Number | Name | Date |
|---|---|---|
| 472,386 | McLeod et al. | Apr. 5, 1892 |
| 702,993 | Pitts | June 24, 1902 |

FOREIGN PATENTS

| Number | Country | Date |
|---|---|---|
| 117,662 | Germany | Feb. 11, 1901 |